United States Patent
Gurvich et al.

(10) Patent No.: US 10,823,213 B2
(45) Date of Patent: Nov. 3, 2020

(54) COMPOSITE JOINT ASSEMBLY

(71) Applicant: GOODRICH CORPORATION, Charlotte, NC (US)

(72) Inventors: Mark R. Gurvich, Middletown, CT (US); Georgios S. Zafiris, Glastonbury, CT (US); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 229 days.

(21) Appl. No.: 16/003,865

(22) Filed: Jun. 8, 2018

(65) Prior Publication Data

US 2019/0376543 A1 Dec. 12, 2019

(51) Int. Cl.
*F16B 7/04* (2006.01)
*B64C 25/00* (2006.01)

(52) U.S. Cl.
CPC .............. *F16B 7/042* (2013.01); *B64C 25/00* (2013.01)

(58) Field of Classification Search
CPC .......... F16C 3/026; F16C 7/026; B29C 65/56; B29C 65/567; B29C 65/568; B29C 66/70; B29C 66/71; B29C 66/712; B29C 66/74; B29C 66/742; B29C 57/00; B29C 57/02; B29C 57/10; F16B 7/02; F16B 7/025; Y10T 403/49; Y10T 403/7064
See application file for complete search history.

(56) References Cited

U.S. PATENT DOCUMENTS

| | | | | |
|---|---|---|---|---|
| 4,236,386 A | * | 12/1980 | Yates | ...................... B29C 70/86 |
| | | | | 138/109 |
| 4,238,540 A | * | 12/1980 | Yates | ...................... F16C 3/026 |
| | | | | 156/172 |
| 4,279,275 A | | 7/1981 | Stanwood et al. | |
| 4,849,152 A | * | 7/1989 | Rumberger | ........... B29C 53/566 |
| | | | | 264/308 |
| 5,043,217 A | | 8/1991 | Peters et al. | |
| 5,215,413 A | | 6/1993 | Nance | |

(Continued)

FOREIGN PATENT DOCUMENTS

DE 102007051517 A1 * 4/2009 ............ B29C 70/52
DE 102017216085 3/2018

(Continued)

OTHER PUBLICATIONS

European Patent Office, European Search Report dated Oct. 15, 2019 in Application No. 19179114.4.

(Continued)

*Primary Examiner* — Jonathan P Masinick
(74) *Attorney, Agent, or Firm* — Snell & Wilmer L.L.P.

(57) ABSTRACT

A composite tube may include a body having a longitudinal centerline axis and an end portion having a tapered section and an end rim. At least one of a radially outward edge and a radially inward edge of the end rim may be non-circular. The end rim may be circumferentially continuous, and the tapered section may diverge radially outward in a direction from the body to the end rim. A joint assembly may include a support wedge that at least partially engages at least one of a radially inward surface of the end portion and a radially outward surface of the end portion of the composite tube.

18 Claims, 17 Drawing Sheets

(56) References Cited

U.S. PATENT DOCUMENTS

| | | | |
|---|---|---|---|
| 5,397,272 A * | 3/1995 | Smiley | F16C 3/026 |
| | | | 138/109 |
| 8,262,825 B2 | 9/2012 | Fahey et al. | |
| 8,430,759 B2 | 4/2013 | Wanthal | |
| 8,801,994 B2 | 8/2014 | Dewhirst | |
| 9,217,463 B2 * | 12/2015 | Oessenich | F01D 5/06 |
| 9,441,374 B2 * | 9/2016 | Ganis | E04C 3/36 |
| 9,568,040 B2 * | 2/2017 | Ganis | F16B 7/025 |
| 9,726,325 B2 * | 8/2017 | Ganis | F16S 3/04 |
| 10,012,254 B2 * | 7/2018 | Ito | B29C 66/534 |
| 10,066,649 B2 * | 9/2018 | Ganis | F16J 1/008 |
| 10,532,518 B2 * | 1/2020 | Gurvich | B29C 66/612 |
| 10,539,174 B2 * | 1/2020 | Gurvich | B29C 57/10 |
| 2010/0122606 A1 * | 5/2010 | Stephan | B29C 70/86 |
| | | | 74/579 R |
| 2016/0272304 A1 | 9/2016 | Goldring et al. | |
| 2017/0051767 A1 * | 2/2017 | Giannakopoulos | |
| | | | F15B 15/1447 |
| 2017/0102012 A1 | 4/2017 | Ganis et al. | |
| 2017/0198734 A1 * | 7/2017 | Bernard | F16C 7/026 |
| 2017/0227058 A1 | 8/2017 | Pollitt | |
| 2017/0340860 A1 * | 11/2017 | Eberhardt | A61M 25/0097 |
| 2018/0094663 A1 * | 4/2018 | Gurvich | B64C 25/00 |
| 2018/0127241 A1 * | 5/2018 | Fargo | B66B 7/062 |
| 2018/0283425 A1 * | 10/2018 | Bernard | F16C 7/026 |
| 2019/0128449 A1 * | 5/2019 | Beale | F16C 7/026 |
| 2019/0145448 A1 * | 5/2019 | Gurvich | F16B 11/002 |

FOREIGN PATENT DOCUMENTS

| | | | | |
|---|---|---|---|---|
| EP | 3081822 | 10/2016 | | |
| GB | 1330313 | 9/1973 | | |
| GB | 2258899 A * | 2/1993 | | E21B 17/04 |
| GB | 2454958 | 5/2009 | | |
| JP | H03288012 | 12/1991 | | |
| SU | 1513102 | 10/1989 | | |

OTHER PUBLICATIONS

European Patent Office, European Search Report dated Nov. 16, 2018 in Application No. 18183005.0.
Mark R. Gurvich, et al. U.S. Appl. No. 15/646,506, filed Jul. 11, 2017 entitled "Composite Joint Assembly".
USPTO, Pre-Interview First Office Action dated Mar. 23, 2020 in U.S. Appl. No. 15/646,506.

* cited by examiner

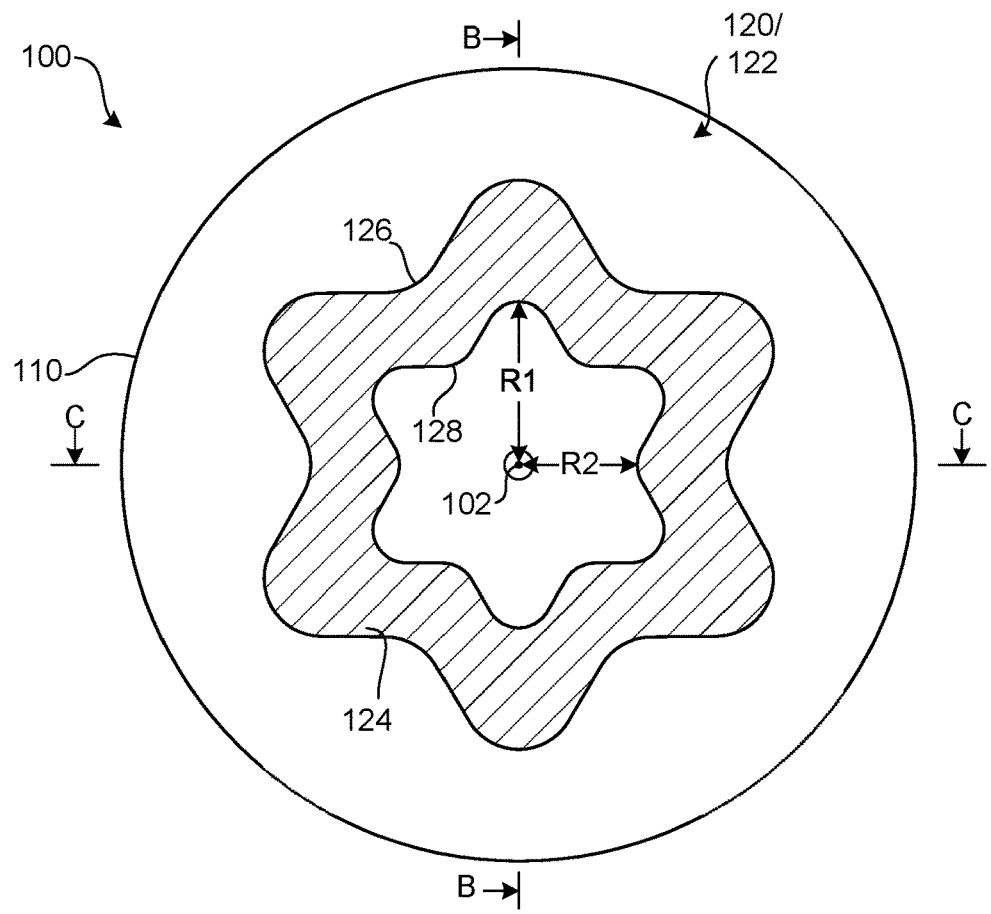
FIG. 2A
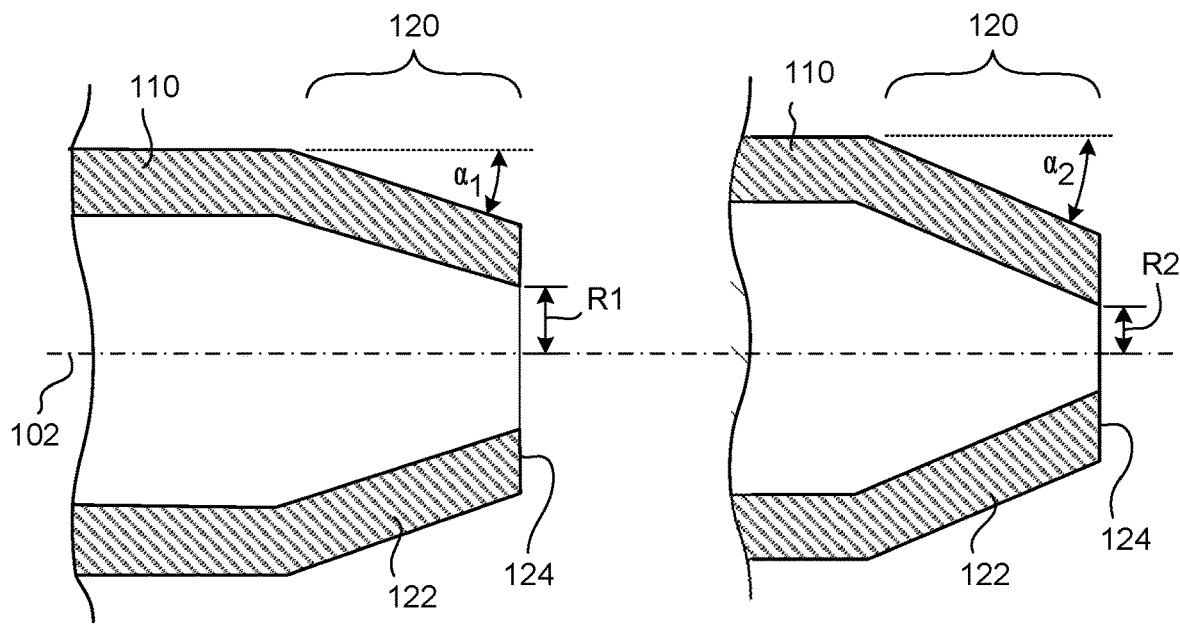
FIG. 2B
FIG. 2C

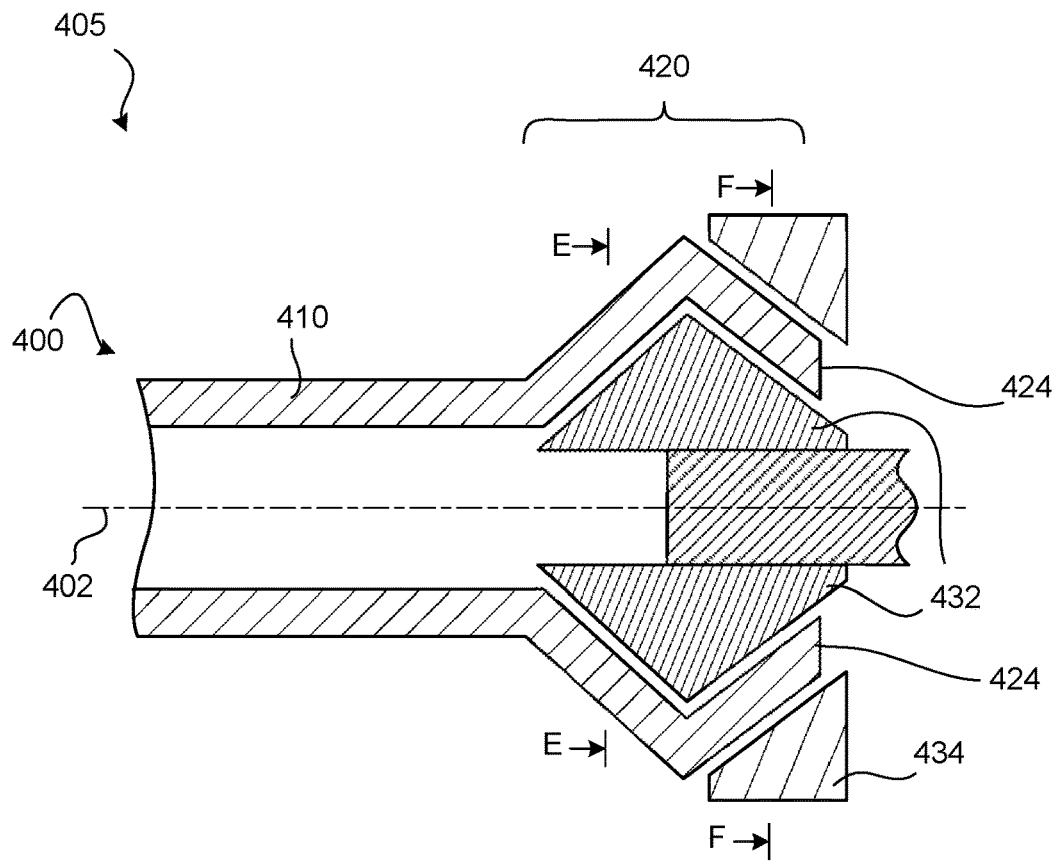
FIG. 13A
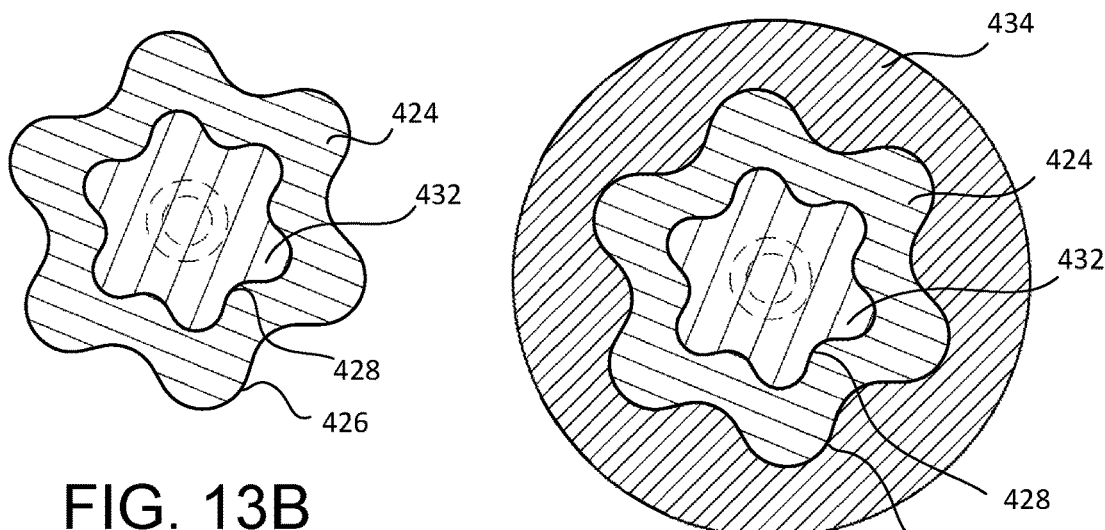
FIG. 13B
FIG. 13C

COMPOSITE JOINT ASSEMBLY

FIELD

The present disclosure relates generally to composite joints and more specifically to improving load transfer via composite joints.

BACKGROUND

Conventionally, various types of aircraft utilize actuators for various operations, such as, for example, deploying landing gear systems. Many such conventional actuator components are made from metallic materials, which are heavy and add weight to an aircraft. Substitution of metals by fiber-reinforced polymer-matrix composites (PMC) is one way to reduce weight of landing gears or aircraft actuators. While PMCs may have various weight-saving benefits, conventional PMCs are not well suited for load transfer, such as axial or torsional loads from composite elements to metallic parts (and vice versa). That is, while composite elements, such as those fabricated in the form of tubes, are capable of handling significant axial loads under both tension and compression, conventional methods of attaching composite materials to other materials, such as metallic materials, can reduce the structural performance of the joint, especially when said joints are subjected to torsional loads.

SUMMARY

In various embodiments, the present disclosure provides a composite tube that includes a body and an end portion. The body has a longitudinal centerline axis and the end portion has a tapered section terminating at an end rim, according to various embodiments. At least one of a radially outward edge of the end rim and a radially inward edge of the end rim is non-circular, according to various embodiments.

In various embodiments, the end rim is circumferentially continuous. In various embodiments, the tapered section diverges radially outward in a direction from the body to the end rim. In various embodiments, the tapered section includes a diverging section and a converging section. In various embodiments, the tapered section may include at least one groove. In various embodiments, at least one groove may extend across the diverging section and the converging section. In various embodiments, a circumferential width of the at least one groove increases linearly along an axial span of the at least one groove. In various embodiments, a circumferential width of the at least one groove is substantially uniform along an axial span of the at least one groove. In various embodiments, opposing sidewalls that define the at least one groove are each concave along an axial span of the at least one groove. In various embodiments, opposing sidewalls that define the at least one groove are each convex along an axial span of the at least one groove. In various embodiments, opposing sidewalls that define the at least one groove are non-monotonic along an axial span of the at least one groove.

In various embodiments, a radial depth of the at least one groove increases linearly along an axial span of the at least one groove. In various embodiments, a radial depth of the at least one groove is substantially uniform along an axial span of the at least one groove. In various embodiments, a bottom wall of the at least one groove is concave along an axial span of the at least one groove. In various embodiments, a bottom wall of the at least one groove is convex along an axial span of the at least one groove. In various embodiments, a bottom wall of the at least one groove is non-monotonic along an axial span of the at least one groove. In various embodiments, the at least one groove includes a spiral shape that extends along and partially around a surface of the tapered section.

Also disclosed herein, according to various embodiments, is a joint assembly. The joint assembly may include a composite tube having a body. The body may have a longitudinal centerline axis and an end portion of the composite tube may include an end rim that is circumferentially continuous. In various embodiments, at least one of a radially outward edge and a radially inward edge of the end rim is non-circular. The joint assembly may also include a support wedge that at least partially engages at least one of a radially inward surface of the end portion and a radially outward surface of the end portion. In various embodiments, the end portion of the composite tube has a tapered section that diverges radially outward in a direction from the body to the end rim.

Also disclosed herein, according to various embodiments, is a method of forming a joint assembly. The method may include forming an end portion of a composite tube, wherein the end portion comprises a tapered section having at least one groove formed thereon. The method may also include engaging a support wedge to the end portion of the composite tube, wherein the support wedge comprises contours that complement the at least one groove of the tapered section. Still further, the method may include curing or solidifying the composite tube.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 2A illustrates an end view of an end portion of a composite tube, in accordance with various embodiments;

FIG. 2B illustrates a cross-sectional side view, from viewpoint "B-B" in FIG. 2A, of the end portion of the composite tube of FIG. 2A, in accordance with various embodiments;

FIG. 2C illustrates a cross-sectional side view, from viewpoint "C-C" in FIG. 2A, of the end portion of the composite tube of FIG. 2A, in accordance with various embodiments;

FIG. 13A illustrates a cross-sectional side view of a joint assembly, in accordance with various embodiments;

FIG. 13B illustrates a cross-sectional end view of a joint assembly, from viewpoint "E-E" in FIG. 13A, in accordance with various embodiments;

FIG. 13C illustrates a cross-sectional end view of a joint assembly, from viewpoint "F-F" in FIG. 13A, in accordance with various embodiments;

Figure 1:
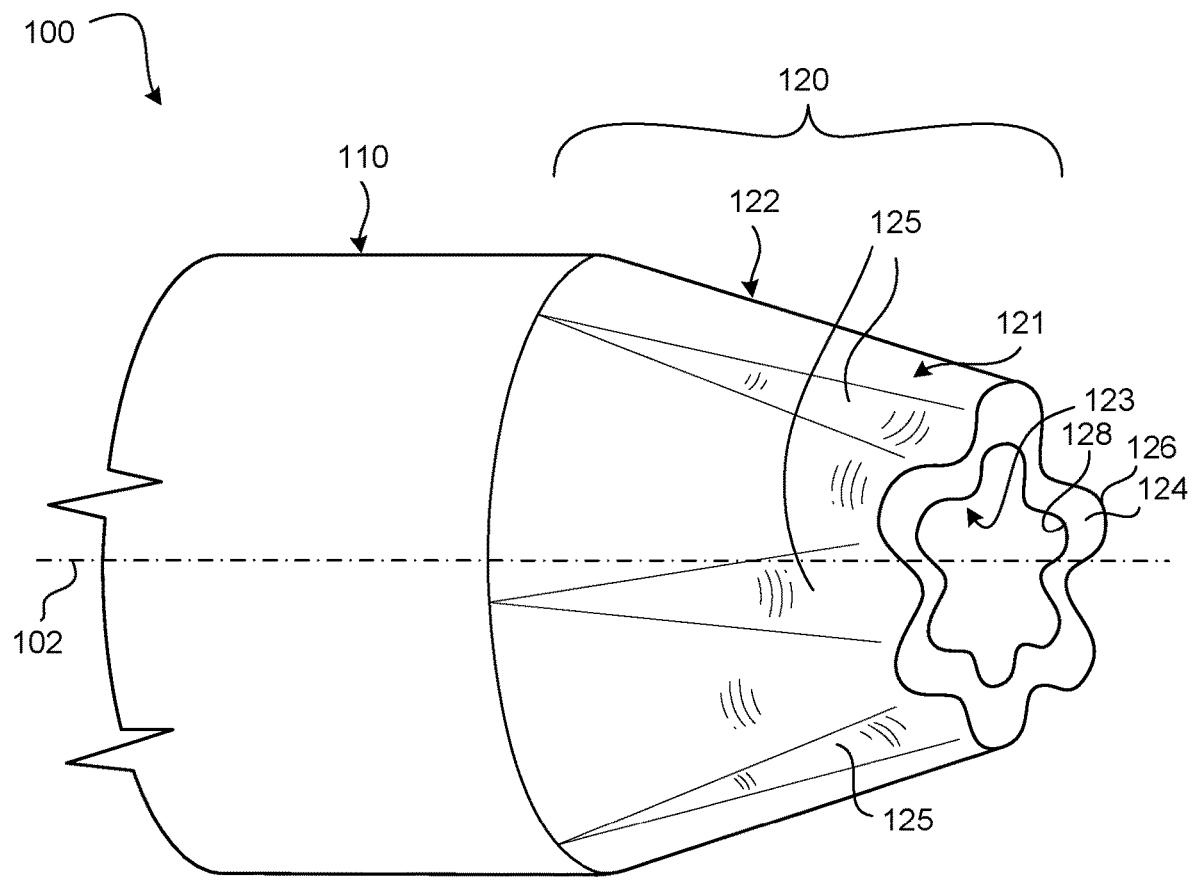
FIG. 1 illustrates a perspective view of an composite tube having a body and an end portion, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

The present disclosure describes composite tubes and composite joint assemblies. In various embodiments, the present disclosure relates to connecting composite tubes to other components via a composite joint assembly (e.g., "joints"). Such joints may be used in aircraft systems, such as, for example, landing gear systems. However, the systems and methods of the present disclosure may be suitable for use in non-aircraft systems as well.

As used herein, the term "axial" refers to a position or direction along a longitudinal centerline axis of a composite tube. Also, the term "radial" refers to a position or direction away from the longitudinal centerline axis of the composite tube. For example, a first component that is "radially inward" of a second component means that the first component is positioned closer to the longitudinal centerline axis of the composite tube than the second component.

As mentioned above, substitution of metals by fiber-reinforced polymer-matrix composites (PMC) is one way to reduce weight of landing gears or aircraft actuators. Among significant challenges is implementation of strong joints for load transfer from composite tube elements to metallic parts. In various embodiments, the composite tubes are fabricated to handle axial and/or torsional loads.

Stress concentrations may be generated in areas of the joint in response to axial and/or torsional loading of the composite tube. These stress concentrations indicate the most loaded locations in the composite element and, therefore, may be main factors affecting limits of their structural performance, i.e., their strength. Accordingly, the present disclosure, according to various embodiments, relates to improving joint strength of composite joint assemblies.

With reference to FIG. 1, a composite tube 100 is illustrated having a body 110 and an end portion 120. The end portion 120, according to various embodiments, includes a tapered section 122 and an end rim 124. The end rim 124 is bound by a radially outward edge 126 and a radially inward edge 128. In various embodiments, at least one of the radially outward edge 126 and the radially inward edge 128 has a non-circular cross-section. The end rim 124 may be circumferentially continuous and thus may be a non-circular annulus. As used herein, the term "non-circular annulus" means a ring-like shape that has an inner border that is non-circular and/or an outer border that is non-circular. For example, the radially outward edge 126 and/or the radially inward edge 128 of the end rim 124 may have an undulating, wave-like ring shape.

In various embodiments, the body 110 of the composite tube 100 defines a hollow chamber extending along the longitudinal centerline axis 102. The body 110 of the composite tube 100 may by cylindrical and thus may have a circular cross-sectional shape. Accordingly, the shape of the end portion 120 (e.g., the non-circular end rim 124) may be different than the cross-sectional shape of the body 110, which may improve the torsional load transfer capabilities of the composite tube 100 when implemented in a joint assembly, as described in greater detail below. Also contributing to the load transfer capabilities of the composite tube 100 is the tapering shape of the end portion 120, tapering along longitudinal centerline axis 102. That is, the interface between the tapering shape of the end portion 120 and the support wedge(s), as described below, tend to enable the transfer of axial loads, such as axial tension. For example, the end portion 120 may be compressed between two metallic parts, such as a radially inward piece and a radially outward piece. The metallic parts may be coupled to each other via mutual bolting or other fastening structures, and may compress the end portion 120 of the composite tube there-between to provide reliable load transfer for axial forces, such as axial tension and compression.

Figure 12:
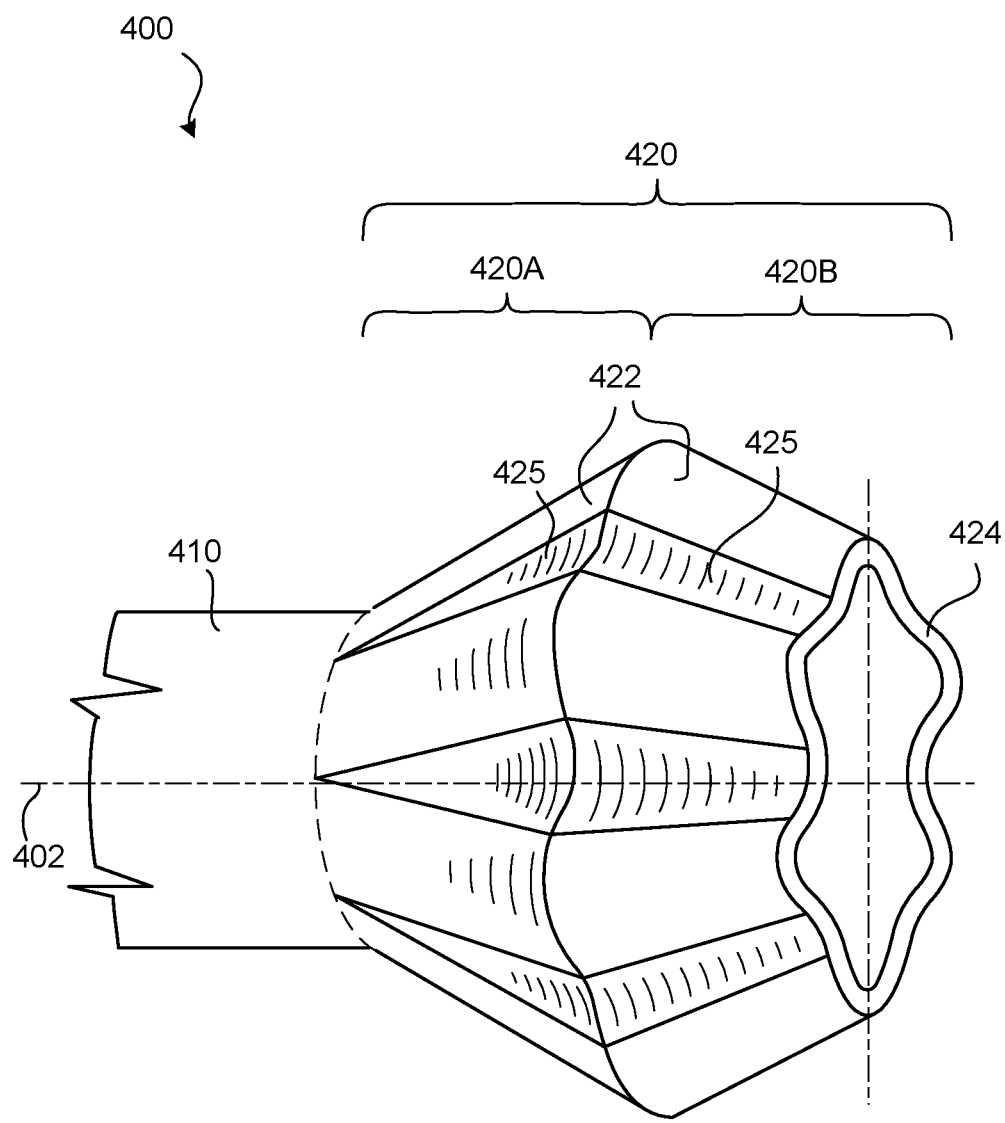
FIG. 12 illustrates a perspective side view of a composite tube having an end portion that has a diverging section and a converging section, in accordance with various embodiments.

In various embodiments, the tapered end portion may converge or diverge. That is, the end portion 120, with continued reference to FIG. 1, may converge radially inward in a direction from the body 110 toward the end rim 124, the end portion 320, with momentary reference to FIG. 10, may diverge radially outward in a direction from the body 310 toward the end rim 324, or the end portion 420, with momentary reference to FIG. 12, may have a diverging section 420A and converging section 420B. Additional details pertaining to these configurations are included below with reference to the pertinent figures.

In various embodiments, and with reference to FIG. 1, the tapered section 122 may have a quasi-conical shape. Stated differently, the tapered section 122 may have a converging, frustoconical-like shape but the "walls" of the shape may be radially undulating, thus forming fold-like contours into the walls of the tapered section 122. In various embodiments, the tapered section 122 of the end portion 120 has a plurality of folds that form circumferentially distributed grooves 125 extending along the tapered section 122. The grooves 125 may be non-periodic in the circumferential direction. That is, the grooves 125 may be non-uniformly distributed around the circumference of the tapered section 122. In various embodiments, the folds/grooves 125 may extend along the entire length of the tapered section 122, the grooves 125 may be shorter than the tapered section 122, or the grooves 125 may be longer than the tapered section 122. In various embodiments, the tapered section 122 has a non-circular cross-section, which may be similar to the shape of the end rim 124. Said differently, at least one of a radially inward surface 123 and a radially outward surface 121 of the end portion 120 (e.g., the tapered section 122 of the end portion 120) may have contours, grooves, channels, etc., that impart a non-circular cross-sectional shape to the end portion 120 of the composite tube 100. In various embodiments, the folds/grooves 125 are smooth curves that may be free of sharp or abrupt directional changes.

As described in greater detail below with reference to FIG. 5, the folds/grooves 125 may be formed by crimping and/or clamping an uncured composite tube. Also as described in greater detail below with reference to FIG. 5, the composite tube 100 may be a polymer-matrix composite (e.g., a fiber-reinforced polymer). In various embodiments, the composite tube 100 is made from carbon fiber composite materials, glass fiber composite materials, organic fiber reinforced composite materials, or ceramic matrix composite materials, or combinations thereof. The weight, strength, and stiffness of composite tubes may be dictated by fiber type, fiber stiffness, fiber strength, fiber direction/placement, resin system used, and other parameters of the composite lay-up.

An end view of the end portion 120 of the composite tube 100, according to various embodiments, is provided in FIG. 2A. The end rim 124 of the end portion 120 may have an undulating shape and thus the radius, relative to the longitudinal centerline axis 102, of the opening defined by the end rim 124 may vary. For example, inner radial dimension R1 may be greater than inner radial dimension R2. Said differently, the radial distance between the longitudinal centerline axis 102 and the radially inward edge 128 of the end rim 124 may vary. In various embodiments, the radial distance between the longitudinal centerline axis 102 and the radially outward edge 126 of the end rim 124 may vary. In various embodiments, the wave-like end rim 124 includes waves that have uniform shapes and curvatures. In various embodiments, however, the wave-like end rim 124 includes wave sections that are not uniform with each other and thus have different shapes and curvatures. In various embodiments, the number of waves may be different than what is shown in the figures. In various embodiments, the number of waves is at least one. In various embodiments, the number of waves is 2 or more. For example, in various embodiments, the number of waves is between 3 and 6.

In various embodiments, and with reference to FIGS. 2B and 2C, because of the non-circular shape of the end portion 120 of the composite tube 100, the angled orientation of the tapered section 122 may vary around the circumference of the end portion 120. FIG. 2B is a side view of the composite tube 100 of FIG. 2A from viewpoint "B-B" in FIG. 2A while FIG. 2C is a side view of the composite tube 100 of FIG. 2A from viewpoint "C-C" in FIG. 2A. As used herein, "α" is the angle between the longitudinal centerline axis 102 of the body 110 of the composite tube 100 and the tapered section 122 that forms the end portion 120. Thus, "α" refers to the bend angle of either external or internal surfaces of the tapered section 122 of the end portion 120 relative to the body 110. In various embodiments, $\alpha_1$ in FIG. 2B, which corresponds with R1, is less than $\alpha_2$ in FIG. 2C, which corresponds with R2. In various embodiments, bend angle α may be between 0 degrees and 60 degrees. In various embodiments, the bend angle α may be selected according to the specifics of a given application/configuration (e.g., depending on an expected/anticipated load transfer).

Figure 3:
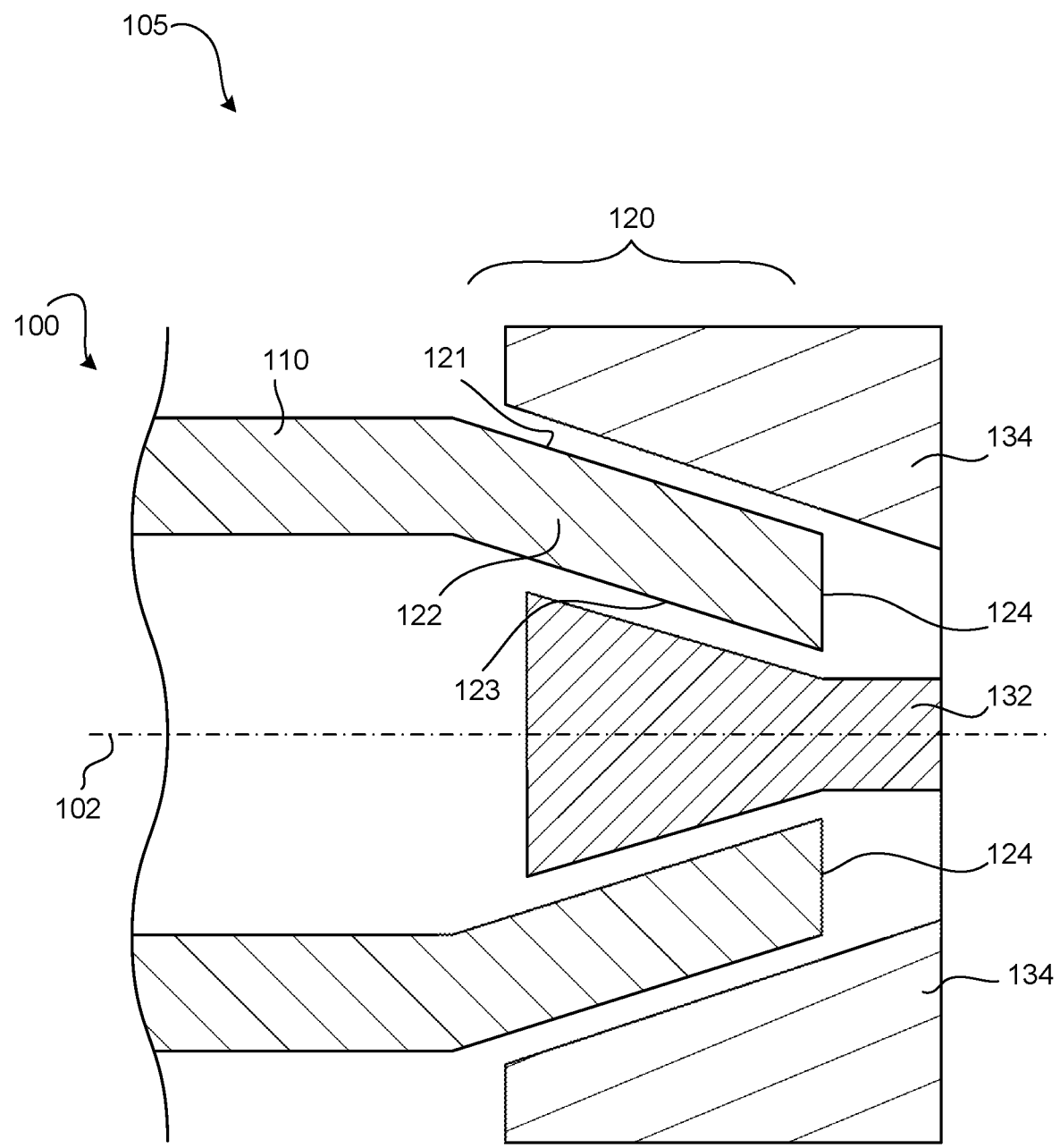
FIG. 3 illustrates a cross-sectional side view of a joint assembly, in accordance with various embodiments.

In various embodiments, and with reference to FIG. 3, a joint assembly 105 is provided. The joint assembly 105 includes the composite tube 100 coupled to one or more support wedges 132, 134. Said differently, at least one support wedge 132, 134 may at least partially engage at least one of the radially inward surface 123 and the radially outward surface 121 of the end portion 120 of the composite tube 100 (though in FIG. 3 the wedge(s) 132, 134 are shown removed from the respective surfaces 121, 123 of the end portion 120, in practice the wedge(s) 132, 134 are contacting the respective surfaces 121, 123 of the end portion 120). In various embodiments, engagement between the support wedge(s) and the end portion 120 is direct contact. The direct contact may be enhanced by pre-stress where the end portion and the support wedge(s) are mutually compressed during assembly of the joint and/or during service. In various embodiments, the wedged/tapered interface between the support wedge(s)s and the end portion prevents pull-apart in response to axial tension. The support wedge(s) 132, 134 may have contours that complement the non-circular shape of the end portion 120 of the composite tube 100, as described in greater detail below with reference to FIGS. 4A, 4B, and 4C.

In various embodiments, the support wedge(s) 132, 134 are made from a metallic material. The support wedge(s) 132, 134 may be made from other materials, such as fiber-reinforced PMC, and/or ceramic materials, among others. The support wedge(s) 132, 134 may be held against (e.g., engaged with) the end portion 120 by applying mechanical force, for example by threaded retraction of first support wedge 132 with respect to second support wedge 134, or vice versa, or other similar attachment means. In various embodiments, the process of curing the composite tube 100 bonds the support wedge 132, 134 to the composite tube 100. In various embodiments, adhesives, resins, or bonding agents may be utilized to bond the support wedge(s) 132, 134 to the composite tube 100.

In various embodiments, and with continued reference to FIG. 3, the joint assembly 105 may include a first support wedge 132 and a second support wedge 134. The first support wedge 132 may be an internal support wedge 132 and thus may be inserted within the opening defined by the end rim 124 formed by converging tapered section 122 of the end portion 120 of the composite tube 100 to engage a radially inward surface 123 of the end portion 120. The second support wedge 134 may be an annular external support wedge 134 that is disposed about and substantially circumscribes the end portion 120 to engage a radially outward surface 121 of the end potion 120.

Figure 4A:
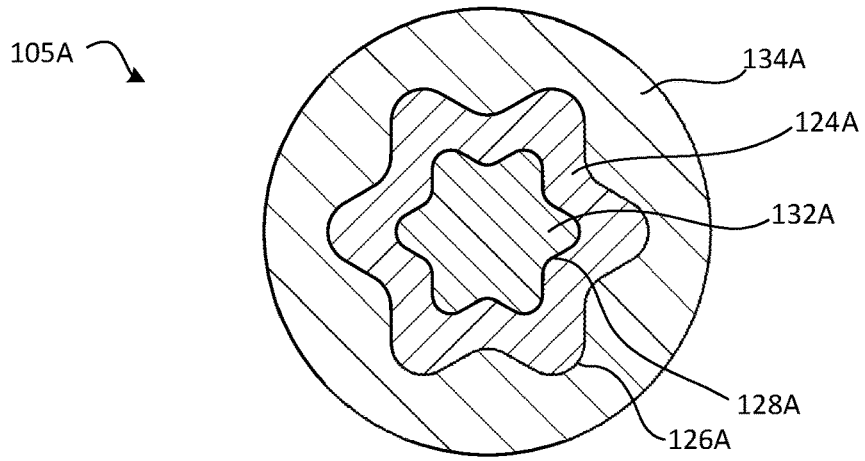
FIG. 4A illustrates a cross-sectional end view of a joint assembly, in accordance with various embodiments.
Figure 4B:
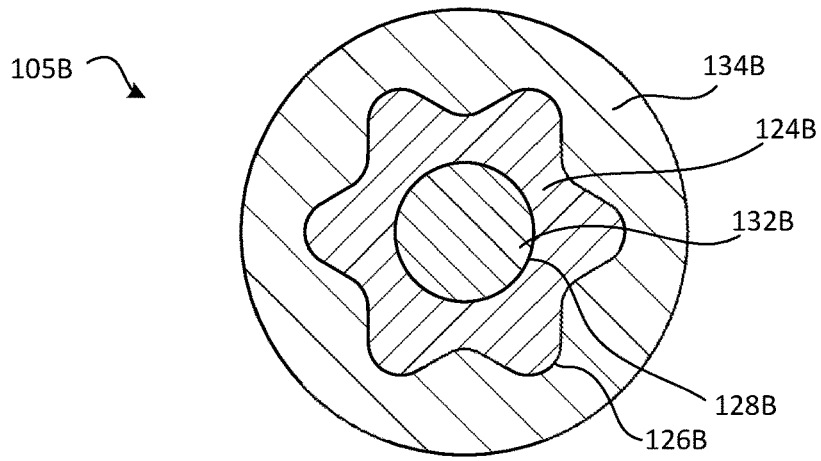
FIG. 4B illustrates a cross-sectional end view of a joint assembly, in accordance with various embodiments.
Figure 4C:
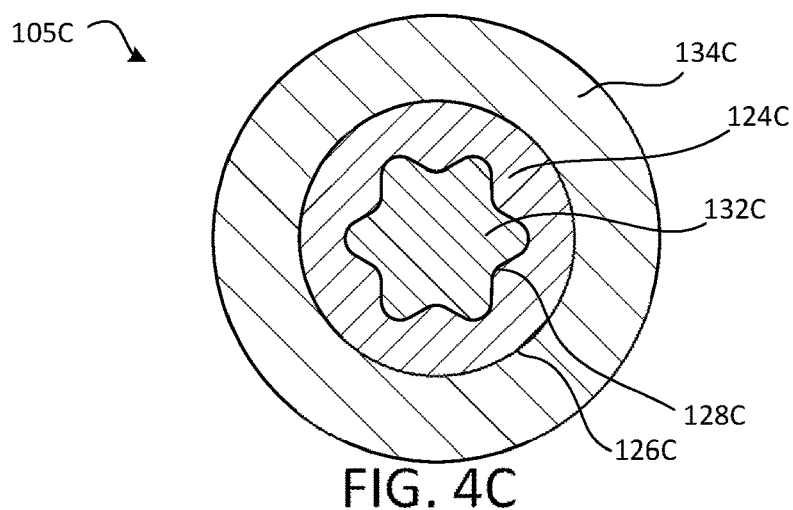
FIG. 4C illustrates a cross-sectional end view of a joint assembly, in accordance with various embodiments.

In various embodiments, and with reference to FIGS. 4A, 4B, and 4C, various configurations of a joint assembly are provided. Joint assembly 105A, with reference to FIG. 4A, includes an end rim 124A that has both a non-circular radially outward edge 126A and a non-circular radially inward edge 128A, according to various embodiments. In various embodiments, the internal support wedge 132A may be contoured to complement the radially inward surface 123 (FIG. 3) of the end portion 120 of the composite tube 100 and the annular external support wedge 134A may be contoured to complement the radially outward surface 121 (FIG. 3) of the end portion 120 of the composite tube 100.

Joint assembly 105B, with reference to FIG. 4B, includes an end rim 124B that has a non-circular radially outward edge 126B and a circular radially inward edge 128B, according to various embodiments. In various embodiments, the internal support wedge 132B may have a circular cross-section that complements a frustoconical, radially inward surface of the end portion 120 of the composite tube 100 and the annular external support wedge 134B may have a non-circular cross-section and thus may be contoured to complement the radially outward surface of the end portion 120 of the composite tube 100. In various embodiments, having only one of the surfaces of the end portion 120 be non-circular decreases manufacturing costs (e.g., less complex machining/manufacturing) and provides a similar torsional load transfer benefit. Joint assembly 105C, with reference to FIG. 4C, includes an end rim 124C that has a circular radially outward edge 126C and a non-circular radially inward edge 128C, according to various embodiments. In various embodiments, the internal support wedge 132C may have a non-circular cross-section that complements a radially inward surface of the end portion 120 of the composite tube 100 and the annular external support wedge 134C may have a circular cross-section and thus may have a frustoconical shape to complement the circular radially outward surface of the end portion 120 of the composite tube 100. In various embodiments, having only one of the surfaces of the end portion 120 be non-circular decreases manufacturing costs (e.g., less complex machining/manufacturing) and provides a similar torsional load transfer benefit.

Figure 5:
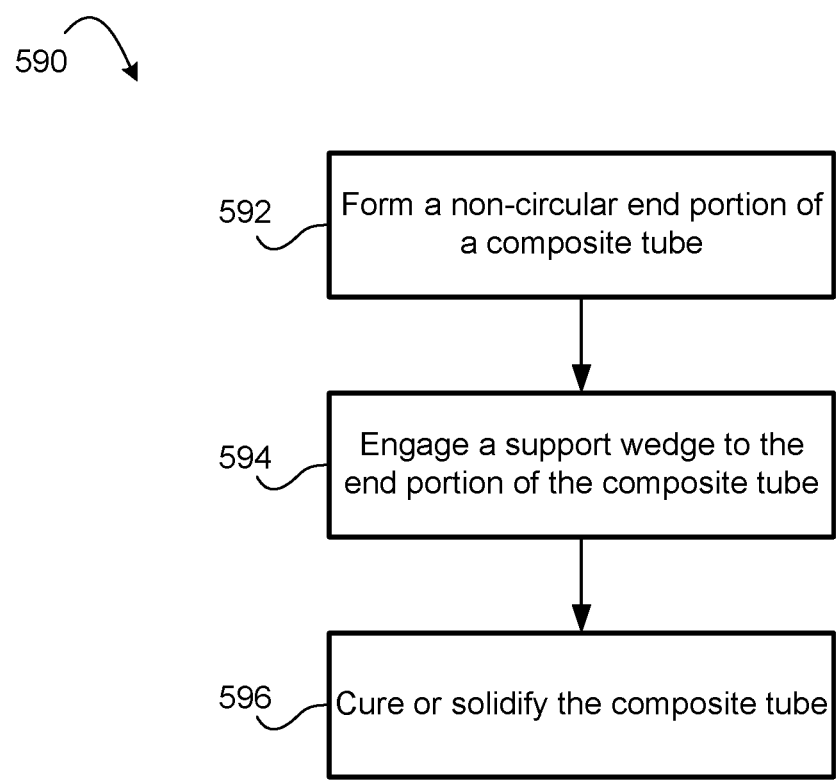
FIG. 5 is a schematic flow chart diagram of a method of manufacturing a joint assembly, in accordance with various embodiments.

In various embodiments, and with reference to FIG. 5, a method 590 for manufacturing a joint assembly is provided. The method 590 includes forming a non-circular end portion of a composite tube at step 592 and engaging a support wedge to the end portion of the composite tube at step 594, according to various embodiments. The method 590 further includes curing or solidifying the composite tube at step 596. In various embodiments, step 592 includes rendering at least one of a radially outward edge and a radially inward edge of an end rim of the end portion non-circular.

In various embodiments, the composite tube may be formed of a thermoset or a thermoplastic material. In various embodiments, initially forming the composite tube may be performed using various manufacturing methods. For example, the method 590 may include laying up a fiber matrix material (e.g., fiber matt, fibers, prepreg, etc.) around/over a removable mandrel. The fiber matrix material may be applied over the mandrel using winding or wrapping techniques, such as a filament-winding technique or an automatic filament placement technique, among others. In various embodiments, the method 590 may include additively manufacturing steps. The method 590 may include impregnating the fiber matrix material with an uncured polymer thermoset resin, a molten thermoplastic polymer, or a thermoplastic polymer in solution. This resin impregnation step may be repeated with additional layers of fiber or fiber-matt matrix material. With thermoplastic materials, the method 590 may include heating the polymer matrix composite to consolidate, shape, and anneal the thermoplastic composite tube. Examples of thermoset polymer resins used in the various embodiments include, but not limited to, epoxy, polyimide, bis-maleimide, polyurethane, and blends or combinations thereof. Examples of thermoplastic polymers used in the various embodiments include, but are not limited to, polyetheretherketone, polyetherimide, polysulfone, polyphenylsulfone, polyphenylene sulfide, and blends or combinations thereof. Examples of fibers used in the various embodiments include, but not limited to, carbon fibers, aramid fibers, glass fibers, and combinations thereof.

In various embodiments, forming the non-circular end portion at step 592 and engaging the support wedge at step 594 may be performed substantially simultaneously. For example, an internal support wedge may be inserted into one (or both) open ends of the composite tube. The internal support wedge may have an external surface that has a desired non-circular cross-section (e.g., that includes grooves or channels). An external clamping force may be applied (e.g., a radial force, an axial force, or both) using clamp components, such as clamp shell molds, to form the end portion of the composite tube to the desired, non-circular shape. In various embodiments, instead of using separate external clamping components, the method may include using the annular external wedge support to provide the clamping pressure/force. In response to the end portion of the composite tube being molded or formed to the desired, non-circular shape, the composite tube may be cured with the internal wedge support secured within the converging tapered section of the composite tube. In various embodiments, the term "curing" may refer to curing thermoset materials or solidifying thermoplastic materials.

In various embodiments, forming the non-circular end portion at step 592 also includes tapering the end portion of the composite tube to form a tapered section that converges radially inward in a direction from the body to the end rim. The tapering step may also be performed substantially simultaneously as steps 592 and 594.

Figure 17:
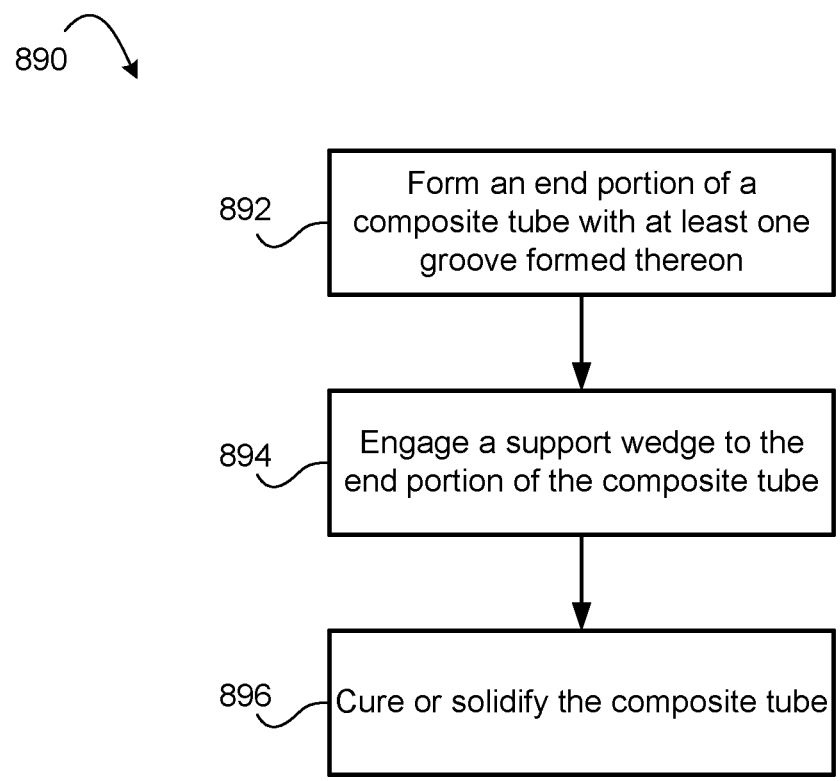
FIG. 17 is a schematic flow chart diagram of a method of manufacturing a joint assembly, in accordance with various embodiments.

In various embodiments, and with reference to FIG. 17, a method 890 for manufacturing a joint assembly is provided. The method 890 includes forming an end portion of a composite tube with at least one groove formed thereon at step 892. The method 890 may further include engaging a support wedge to the end portion of the composite tube at step 894 and curing or solidifying the composite tube at step 896. In various embodiments, step 892 includes rendering at least one of a radially outward edge and a radially inward edge of an end rim of the end portion non-circular.

Figure 6A:
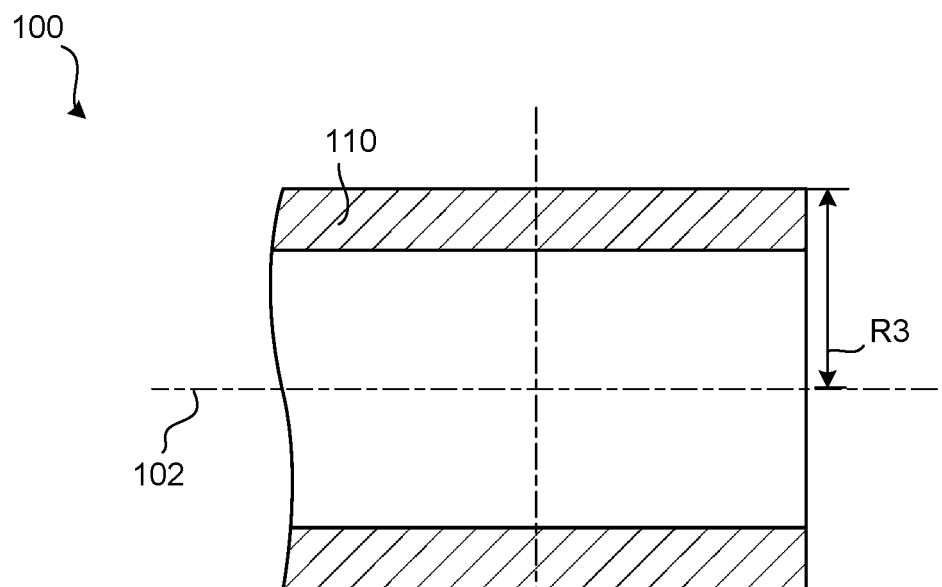
FIG. 6A illustrates a cross-sectional side view of a composite tube before forming grooves thereon, in accordance with various embodiments.
Figure 6B:
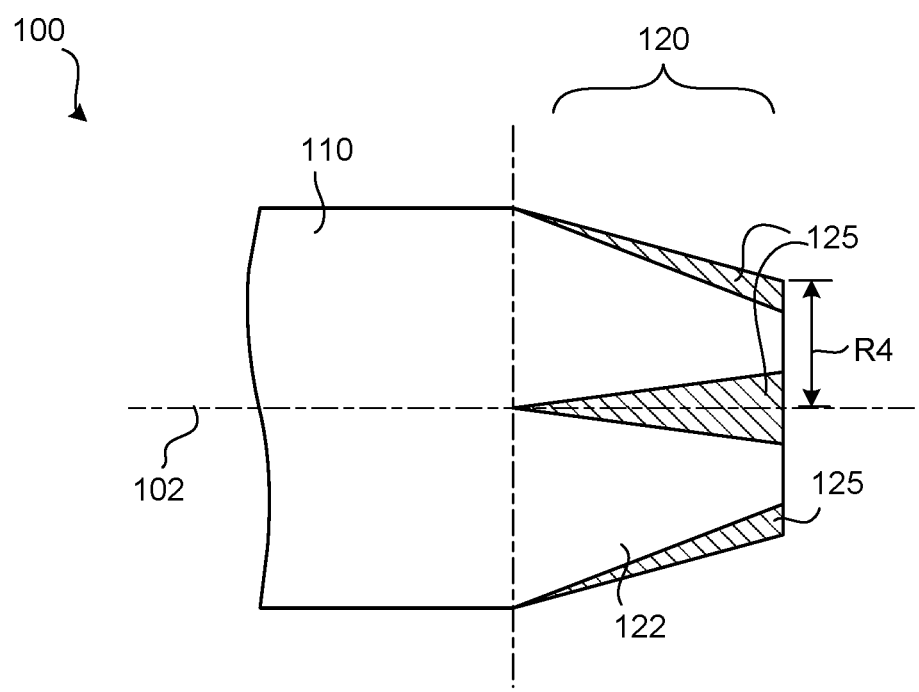
FIG. 6B illustrates a side view of an end portion of the composite tube of FIG. 6A after being shaped and/or cured to have grooves, in accordance with various embodiments.

In various embodiments, and with reference to FIGS. 6A and 6B, the composite tube 100 may be a straight cylinder before being worked, and the straight cylinder may be worked to give the end portion 120 the tapered/conical shape. Further, end portion may be crimped or otherwise radially compressed to form the grooves 125. That is, for example, the outer radius R3 of the end portion 120 of the composite tube 100 before crimping and/or before forming the grooves 125 may be larger than the outer radius R4 of the end portion 120 of the composite tube 100 after crimping and/or after forming the grooves 125. The tapering and the crimping may be performed simultaneously, or via separate steps.

Figure 7A:
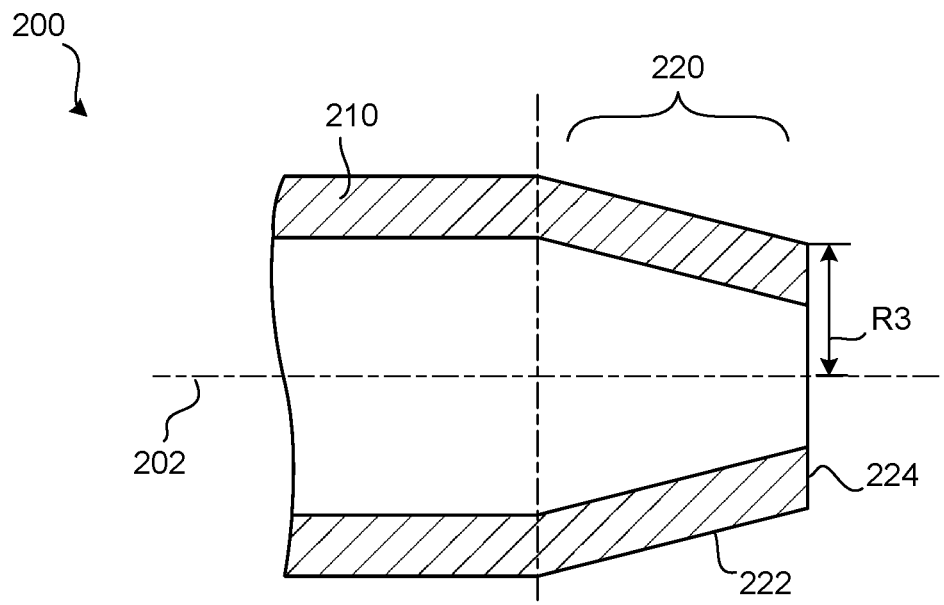
FIG. 7A illustrates a cross-sectional side view of a composite tube having a converging end portion before forming grooves thereon, in accordance with various embodiments.
Figure 7B:
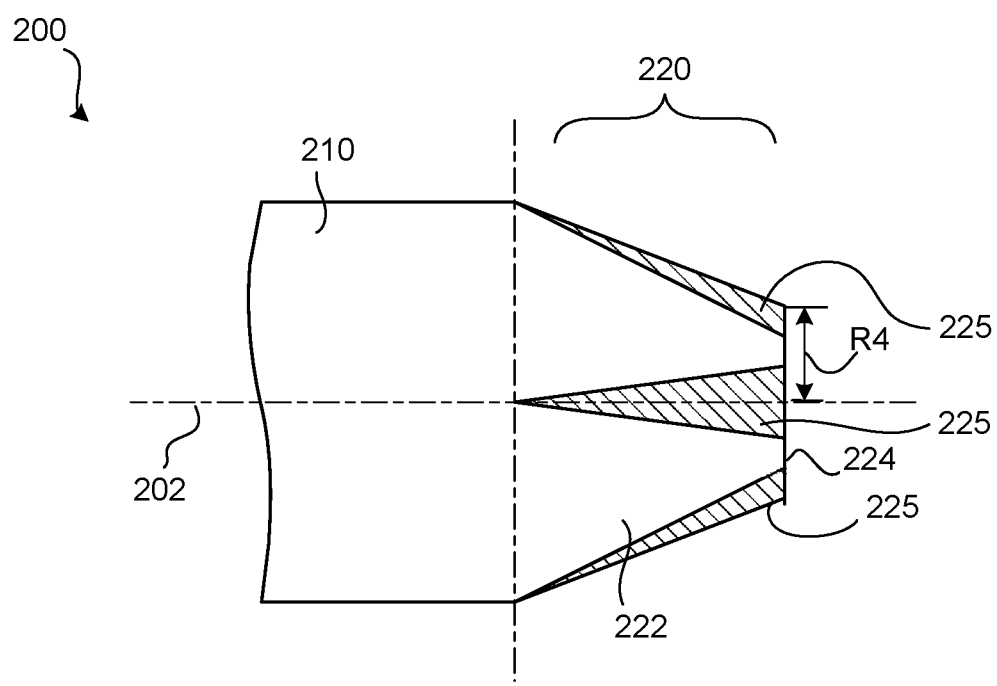
FIG. 7B illustrates a side view of the end portion of the composite tube of FIG. 7A after being shaped and/or cured to have grooves, in accordance with various embodiments.

In various embodiments, and with reference to FIGS. 7A and 7B, the composite tube 200 may initially have a tapered/conical end portion 220 before imparting the non-circular shape to the end portion 220. That is, the composite tube 200 may be provided (originally manufactured) with a cylindrical body 210 having a longitudinal centerline axis 202, and may be originally manufactured to have a tapered section 222 (e.g., a conical end portion 220). The crimping/compressing of the end portion 220 may result in the formation of the grooves 225. This crimping/compressing of the end portion may, according to various embodiments, decrease the radius of the end rim 224. That is, R3 in FIG. 7A may be larger than R4 in FIG. 7B. In various embodiments, R3 may equal R4.

Figure 8A:
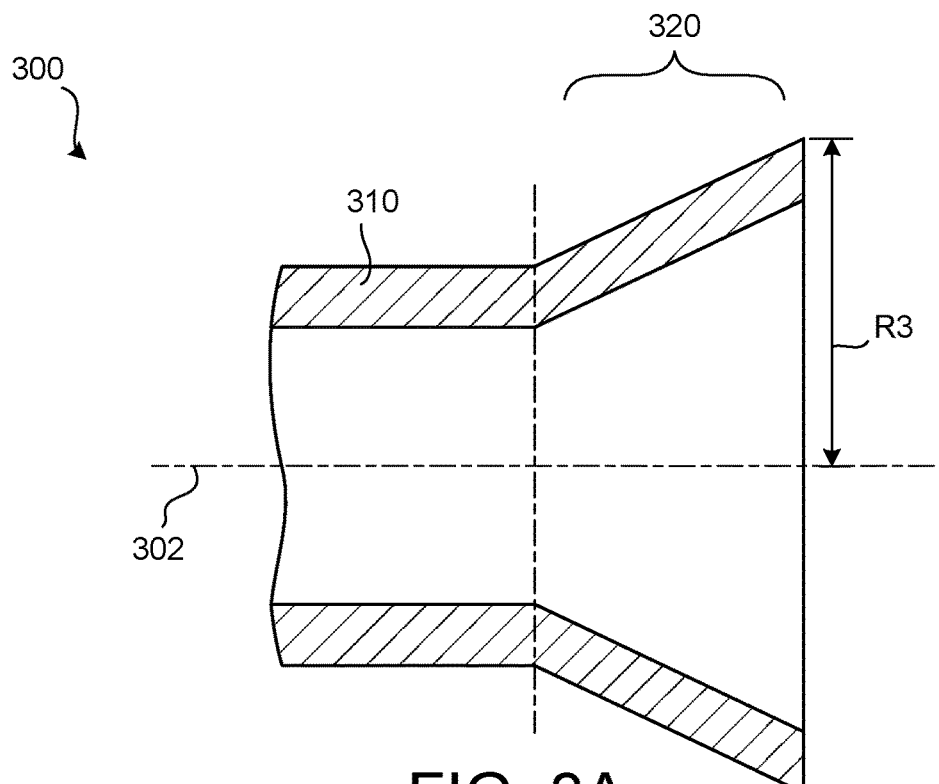
FIG. 8A illustrates a cross-sectional side view of a composite tube having a diverging end portion before forming grooves thereon, in accordance with various embodiments.
Figure 8B:
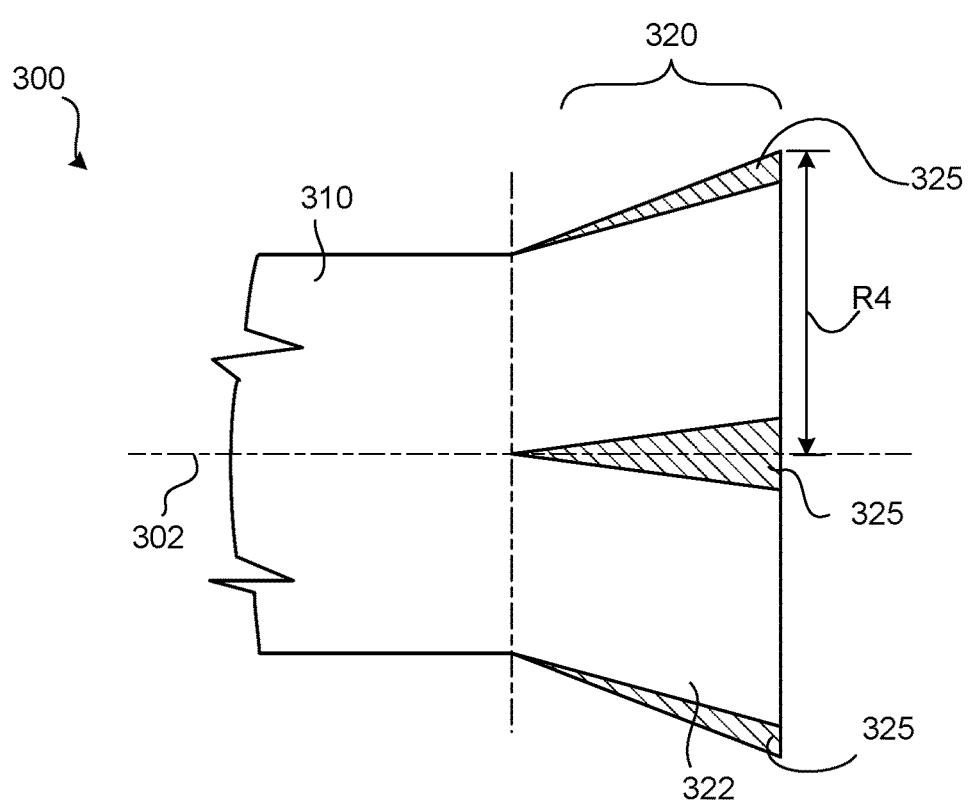
FIG. 8B illustrates a side view of the end portion of the composite tube of FIG. 8A after being shaped and/or cured to have grooves, in accordance with various embodiments.

In various embodiments, and with reference to FIGS. 8A and 8B, the end portion 320 of the composite tube 300 may diverge from the body 310. That is, the end portion 320 may have tapered section 322, which may include tapering walls that diverge radially outward, relative to the longitudinal centerline axis 302 of the composite tube 300. As used herein, the term "tapered" refers to either converging radially inward or diverging radially outward. The composite tube may be originally manufactured as a straight cylinder, such as the one shown in FIG. 6A, or the composite tube 300 may be manufactured to have a diverging/conical shape, as shown in FIG. 8A. The subsequent crimping/compressing of the end portion 320 may result in the formation of the grooves 325. This crimping/compressing of the end portion 320 may, according to various embodiments, decrease the radius of the end rim 324. That is, R3 in FIG. 8A may be larger than R4 in FIG. 8B. In various embodiments, R3 may equal R4. Additional details pertaining to this diverging configuration are included below with reference to FIGS. 10, 11A, and 11B.

Figure 9A:
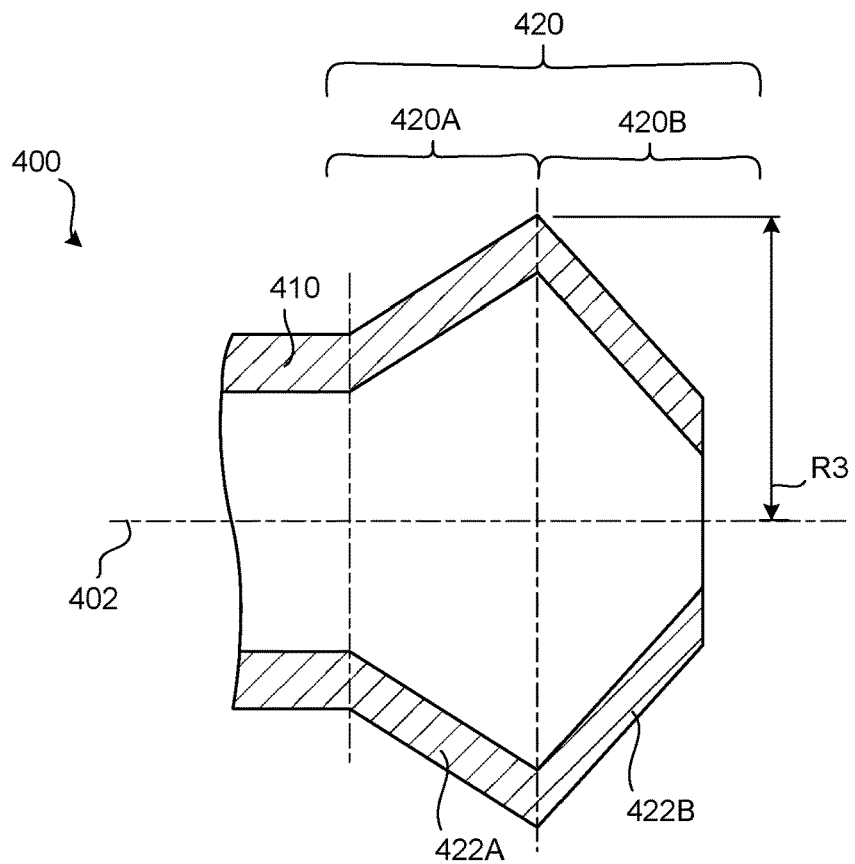
FIG. 9A illustrates a cross-sectional side view of a composite tube having an end portion that has a diverging section and a converging section, in accordance with various embodiments.
Figure 9B:
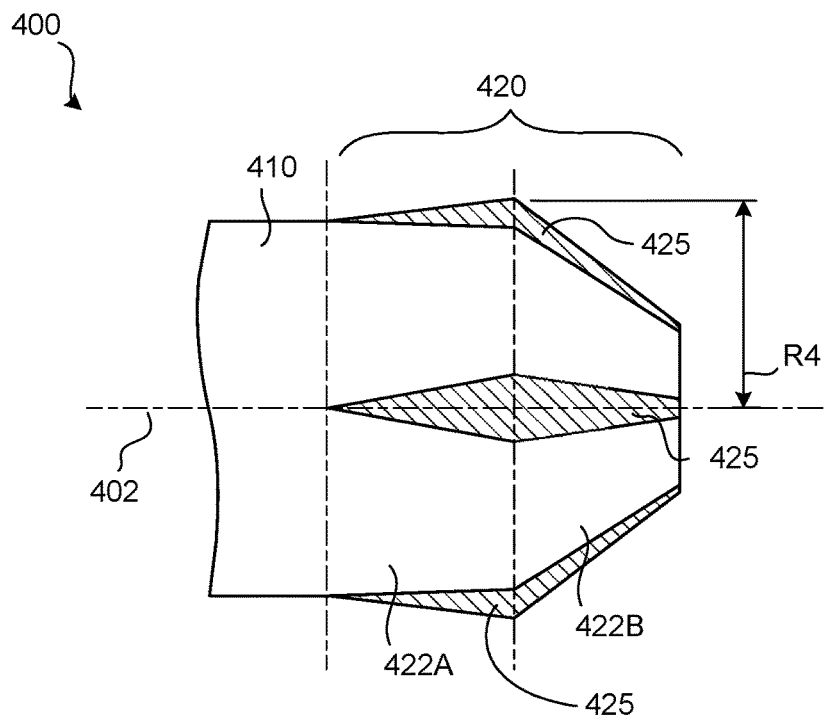
FIG. 9B illustrates a side view of the end portion of the composite tube of FIG. 9A after being shaped and/or cured to have grooves, in accordance with various embodiments.

In various embodiments, and with reference to FIGS. 9A and 9B, the end portion 420 of the composite tube 400 may have both a diverging section 420A and a converging section 420B. That is, the end portion 420 may have tapering, diverging walls 422A that diverge radially outward, relative to the longitudinal centerline axis 402 of the composite tube 400, with tapering, converging walls 422B that converge radially inward, relative to the longitudinal centerline axis 402 of the composite tube 400. The grooves 425 formed on the end portion 420 of the composite tube 400 may extend across at least a portion of both the diverging section 420A and the converging section 420B. As previously noted, the outer radius R3 of the end portion 420 of the composite tube 400 before forming the grooves 425 may be larger than the outer radius R4 of the end portion 420 of the composite tube 400 after forming the grooves 425. In various embodiments, R3 may be equal to R4. Additional details pertaining to this diverging/converging configuration are included below with reference to FIGS. 12, 13A, 13B, and 13C.

Figure 10:
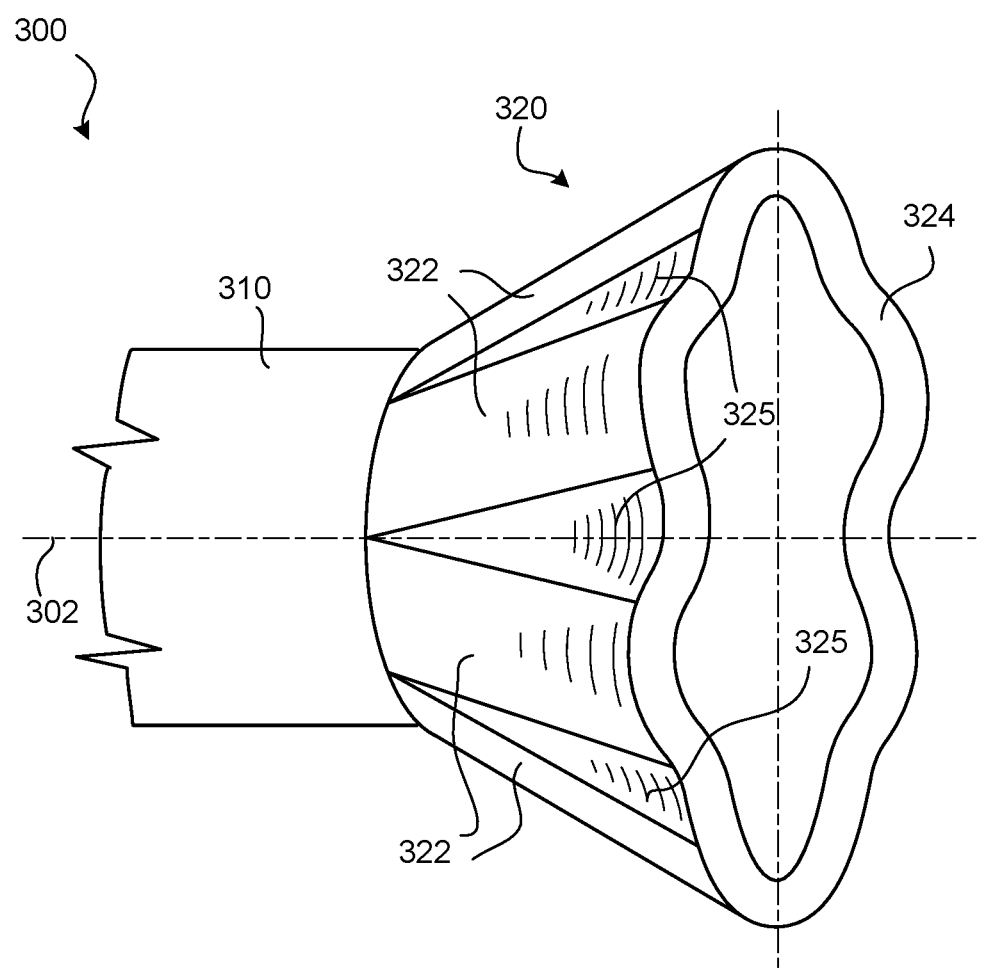
FIG. 10 illustrates a perspective side view of a composite tube having an end portion that diverges, in accordance with various embodiments.
Figure 11A:
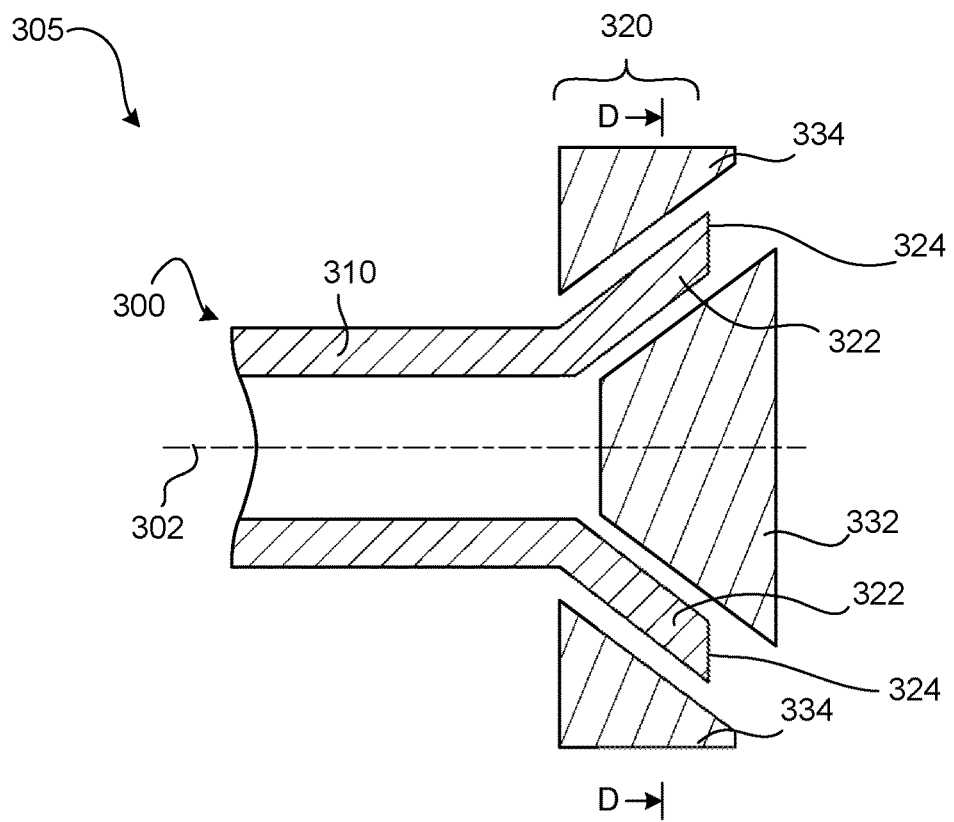
FIG. 11A illustrates a cross-sectional side view of a joint assembly, in accordance with various embodiments.
Figure 11B:
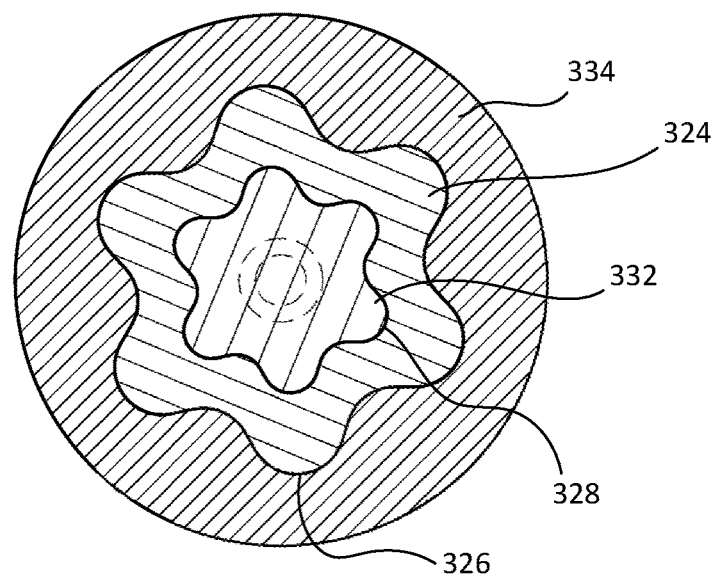
FIG. 11B illustrates a cross-sectional end view of a joint assembly, in accordance with various embodiments.

In various embodiments, and with reference to FIGS. 10, 11A, and 11B, the tapered section 322 may have a quasi-conical shape. Stated differently, the tapered section 322 may have a diverging, cone-like shape but the "walls" of the cone-like shape may be circumferentially undulating, thus forming fold-like contours into the walls of the tapered section 322. In various embodiments, the tapered section 322 of the end portion 320 has a plurality of folds that form circumferentially distributed grooves 325 extending along the tapered section 322. In various embodiments, the folds/grooves 325 may extend along the entire length of the tapered section 322, the grooves 325 may be shorter than the tapered section 322, or the grooves 325 may be longer than the tapered section 322. In various embodiments, the tapered section 322 has a non-circular cross-section, which may be similar to the shape of the end rim 324. Said differently, at least one of a radially inward surface and a radially outward surface of the end portion 320 (e.g., the tapered section 322 of the end portion 320) may have contours, grooves, channels, etc., that impart a non-circular cross-sectional shape to the end portion 320 of the composite tube 300. In various embodiments, the folds/grooves 325 are smooth curves that may be free of sharp or abrupt directional changes.

In various embodiments, the wave-like end rim 324 includes waves that have uniform shapes and curvatures in the hoop direction. In various embodiments, however, the wave-like end rim 324 includes wave sections that are not uniform with each other and thus have different shapes and curvatures. In various embodiments, the number of waves may be different than what is shown in the figures. In various embodiments, the number of waves is at least one. In various embodiments, the number of waves is 2 or more. For example, in various embodiments, the number of waves is between 3 and 16. The end rim 324 of the end portion 320 may have an undulating shape and thus the radius, relative to the longitudinal centerline axis 302, of the opening defined by the end rim 324 may vary, similar to the configuration described above with reference to FIGS. 2A-2C. Further, the composite tube 300 may be made from the same or similar materials as those described above with reference to the converging composite tube 100. Still further, the bend angle between the longitudinal centerline axis 302 of the body 310 of the composite tube 300 and the tapered section 322 may be have a similar magnitude, but in a diverging direction, to the angle "α" described above.

In various embodiments, and with reference to FIGS. 11A and 11B, the composite tube 300 may be implemented in a joint assembly 305. The joint assembly 305 may be similar to the joint assembly 105 described above with reference to FIG. 3, with the exception that the tapered walls 322 diverge instead of converge. The composite tube 300 may be coupled to one or more support wedges 332, 334. Said differently, at least one support wedge 332, 334 may at least partially engage at least one of the radially inward surface and the radially outward surface of the end portion 320 of the composite tube 300 (in FIG. 11A, the wedge(s) 332, 334 are shown removed from the respective surfaces of the end portion 320 in order to clearly show the respective pieces, in implementation the wedge(s) 332, 334 are contacting the respective surfaces of the end portion 320). In various embodiments, engagement between the support wedge(s) and the end portion 320 is direct contact. The direct contact may be enhanced by pre-stress where the end portion and the support wedge(s) are mutually compressed during assembly of the joint and/or during service. In various embodiments, the wedged/tapered interface between the support wedge(s)s and the end portion prevents pull-apart in response to axial tension. FIG. 11B is a cross-sectional view of the joint assembly 305 from viewpoint "D-D" identified in FIG. 11A. The support wedge(s) 332, 334 may have contours that complement the non-circular shape of the end portion 320 of the composite tube 300. The support wedge(s) 332, 334 may be similar and analogous to those described above with reference to FIGS. 3, 4A, 4B, and 4C.

In various embodiments, and with reference to FIGS. 12, 13A, 13B, and 13C, the end portion 420 of the composite tube 400 may have a bulbous shape that is formed of a diverging section 420A and a converging section 420B, and one or both of these subsections 420A, 420B may have grooves 425 formed on the tapering surface 422. That is, the diverging section 420A may extend from the body 410 and the converging section 420B may extend from the diverging section 420A and may terminate at an end rim 424. The diverging section 420A of the composite tube 400 may be similar and analogous to the diverging configuration described above, and the converging section 420B may be similar and analogous to the converging configuration described above. In various embodiments, folds/grooves 425 may be only in section 420A, only in section 420B, or may extend across both sections 420A and 420B. Also, the composite tube 400 may be implemented in a joint assembly 405. The joint assembly 405 may include one or more support wedges 432, 434 that are coupled to the end portion 420. FIG. 13B is a cross-sectional view of the joint assembly 405 from viewpoint "E-E" identified in FIG. 13A and FIG. 13C is a cross-sectional view of the joint assembly 405 from viewpoint "F-F" identified in FIG. 13A.

Figure 14C:
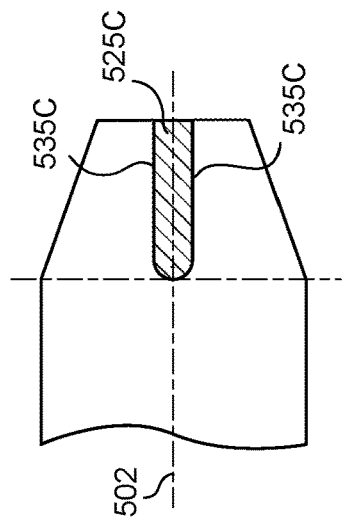
FIGS. 14B, 14C, 14D, 14E, and 14F illustrate side views of an end portion of a composite tube having groove(s) with differential circumferential width patterns, in accordance with various embodiments.
Figure 14F:
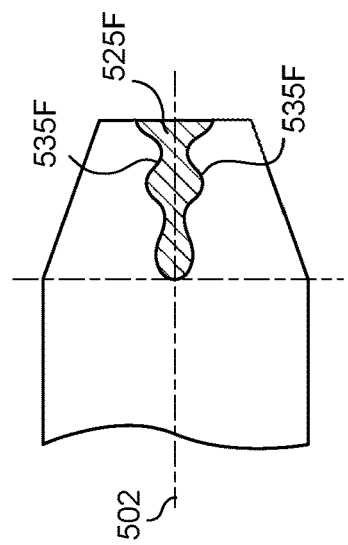
Figure 14B:
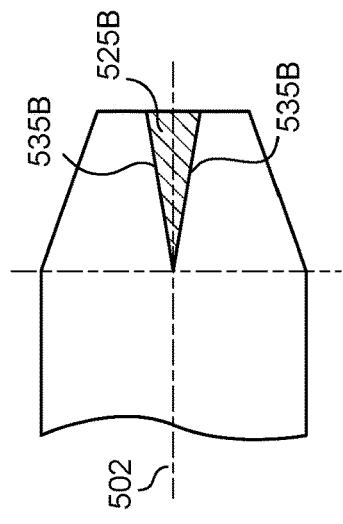
Figure 14E:
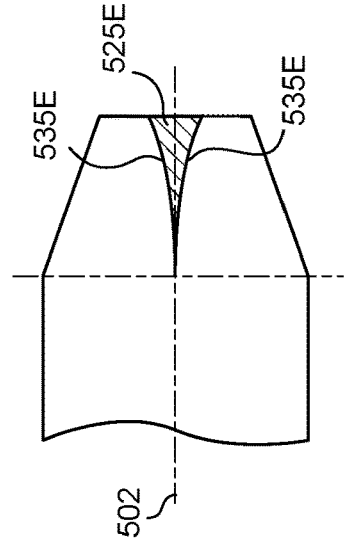
Figure 14A:
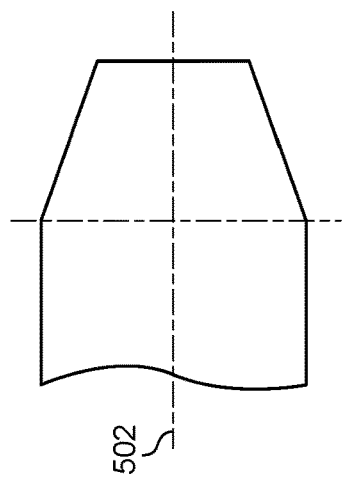
FIG. 14A illustrates a side view of an end portion of a composite tube without any grooves, in accordance with various embodiments.
Figure 14D:
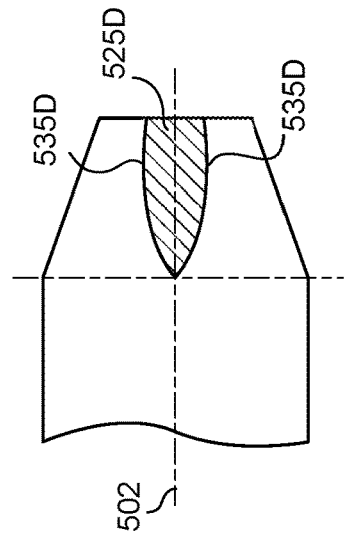

In various embodiments, FIG. 14A shows an end portion of a composite tube without any grooves, while FIGS. 14B, 14C, 14D, 14E, and 14F show grooves 525 (shown as 525B, 525C, 525D, 525E, and 525F in the figures) formed in the end portion that have different circumferential width configurations. That is, FIGS. 14B, 14C, 14D, 14E, and 14F show different circumferential shapes of the grooves 525 formed in the end portion of the composite tube. While the depictions in FIGS. 14B, 14C, 14D, 14E, and 14F show the end portion of the composite tube in a converging configuration (e.g., converging toward longitudinal centerline axis 502), the features and shapes of the grooves discussed herein are also applicable to the diverging configuration and/or the combo configuration that includes both a diverging section and a converging section. In various embodiments, and with reference to FIG. 14B, a circumferential width of the at least one groove 525B increases linearly along an axial span of the at least one groove 525B. Said differently, opposing sidewalls 535B, also referred to as "external contours," of the groove 525B may be linear. In various embodiments, and with reference to FIG. 14C, a circumferential width of the groove 525C is substantially uniform, with exception of the very tip with finite curvature, along an axial span of the groove 525C. That is, the opposing external contours 535C that define the groove 525C may be substantially parallel to each other. In various embodiments, and with reference to FIG. 14D, the opposing external contours 535D that define the groove 525D are each concave along an axial span of the groove 525D. In various embodiments, and with reference to FIG. 14E, the opposing external contours 535E that define the groove 525E are each convex along an axial span of the groove 525E. In various embodiments, and with reference to FIG. 14F, the opposing external contours 535F that define the groove 525F are non-monotonic along an axial span of the groove 525F. That is, the opposing external contours 535F may have an undulating shape. In various embodiments, different combinations of the grooves shown in FIGS. 14B-14F can be used together within one implementation. Also, in various embodiments, grooves of different sizes, e.g., with different lengths, different widths, different depths, etc., can be used.

Figure 15A:
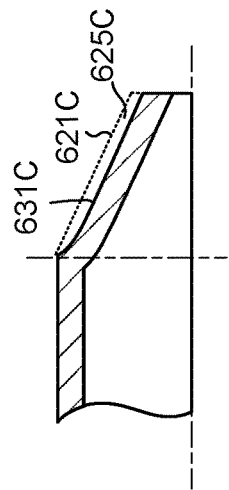
FIG. 15A illustrates a partial cross-sectional side view of an end portion of a composite tube without any grooves, in accordance with various embodiments.
Figure 15B:
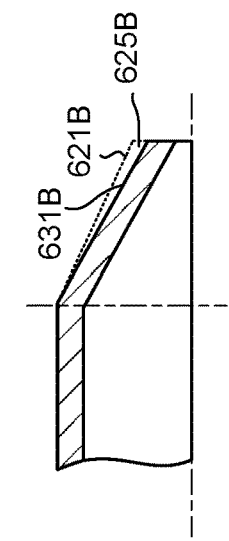
FIGS. 15B, 15C, 15D, 15E, and 15F illustrate partial cross-sectional side views of an end portion of a composite tube having groove(s) with differential radial depth patterns, in accordance with various embodiments.
Figure 15C:
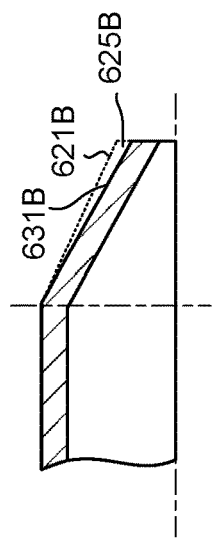
Figure 15D:
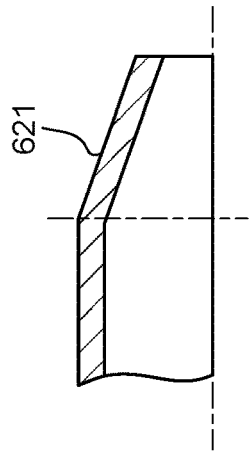
Figure 15E:
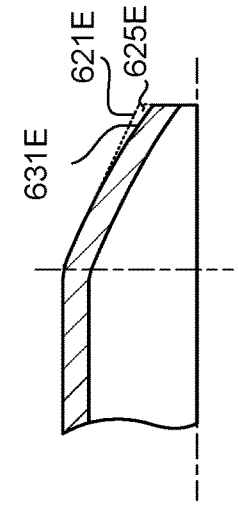
Figure 15F:
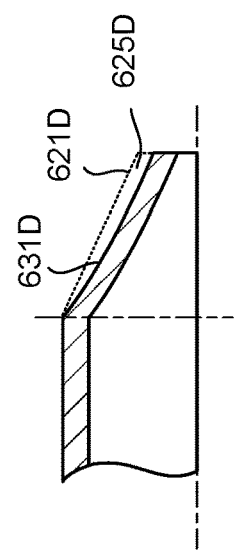

In various embodiments, FIG. 15A shows an end portion of a composite tube without any grooves, while FIGS. 15B, 15C, 15D, 15E, and 15F show grooves 625 (shown as 625B, 625C, 625D, 625E, and 625F in the figures) with different radial depth configurations. That is, FIGS. 15B, 15C, 15D, 15E, and 15F show different radial depth profiles of the grooves 625, relative to the radially outward surface 621 of the tapered section, formed in the end portion of the composite tube. While the depictions in FIGS. 15B, 15C, 15D, 15E, and 15F show the end portion of the composite tube in a converging configuration, the features and shapes of the grooves discussed herein are also applicable to the diverging configuration and/or the combo configuration that includes both a diverging section and a converging section. In various embodiments, and with reference to FIG. 15B, a radial depth of the at least one groove 625B increases linearly along an axial span of the groove 625B. Said differently, the bottom wall 631B of the groove 625B may be linear and may, in the depicted instance, converge at a steeper angle than the radially outward surface 621B of the tapered section/end portion of the composite tube. In various embodiments, and with reference to FIG. 15C, the radial depth of the groove 625C is substantially uniform along an axial span of the groove 625C. That is, the distance between the bottom wall 631C and the projected radial location of radially outward surface 621C is substantially uniform. In various embodiments, and with reference to FIG. 15D, the bottom wall 631D of the groove 625D is concave along an axial span of the groove 625D, relative to the radially outward surface 621D. In various embodiments, and with reference to FIG. 15E, the bottom wall 631E of the groove 625E is convex along an axial span of the groove 625E, relative to the radially outward surface 621E. In various embodiments, and with reference to FIG. 15F, the bottom wall 631F of the groove 625F is non-monotonic along an axial span of the groove 625F, relative to the radially outward surface 621F. That is, the bottom wall 631F may have an undulating shape. In various embodiments, different combinations of the grooves shown in FIGS. 15B-15F can be used together within one implementation. Also, in various embodiments, distribution of depth of the grooves in the hoop direction can be non-uniform, and/or depths in different grooves can be different.

Figure 16:
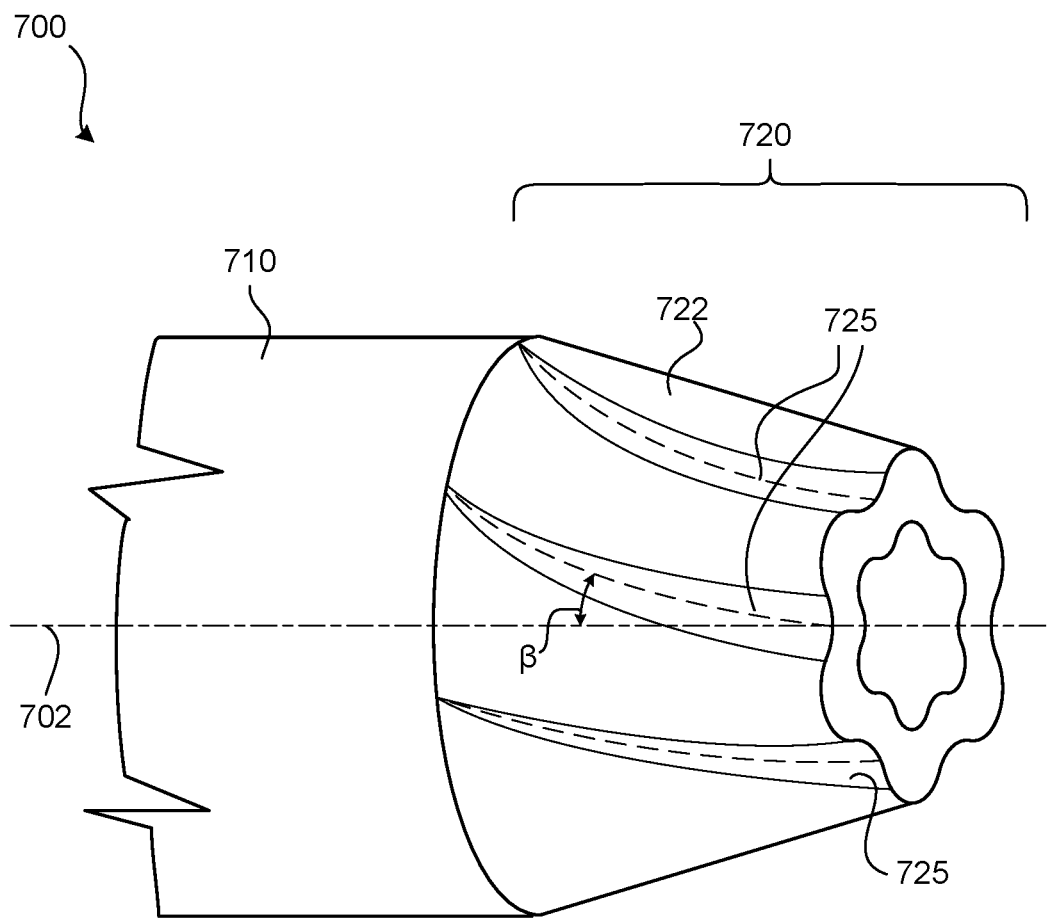
FIG. 16 illustrates a perspective side view of a composite tube having an end portion with helically extending grooves, in accordance with various embodiments.

In various embodiments, and with reference to FIG. 16, a composite tube 700 may have an end portion 720 extending from a body 710 that has a tapered section 722 with one or more grooves 725 that extend in a spiral shape along and partially around a surface of the tapered section 722. That is the grooves 725 may at least partially extend in a spiral/helical pattern around the longitudinal centerline axis 702. In various embodiments, spiral orientation $_R$ can be uniform along the axial direction or non-uniform. Also, spiral orientations may be different in different grooves.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube comprising:
a body comprising a longitudinal centerline axis; and
an end portion comprising a tapered section terminating at an end rim that is circumferentially continuous;
wherein the tapered section comprises at least one groove,
wherein the at least one groove comprises a spiral shape that extends partially circumferentially around the tapered section.

2. The composite tube of claim 1, wherein at least one of a radially outward edge and a radially inward edge of the end rim is non-circular.

3. The composite tube of claim 1, wherein the at least one groove contributes to at least one of a radially outward surface and a radially inward surface of the tapered section being non-circular.

4. The composite tube of claim 1, wherein the tapered section comprises a diverging section and a converging section.

5. The composite tube of claim 4, wherein the at least one groove extends across the diverging section and the converging section.

6. The composite tube of claim 1, wherein a circumferential width of the at least one groove increases linearly along an axial span of the at least one groove.

7. The composite tube of claim 1, wherein a circumferential width of the at least one groove is substantially uniform along an axial span of the at least one groove.

8. The composite tube of claim 1, wherein opposing sidewalls that define the at least one groove are each concave along an axial span of the at least one groove.

9. The composite tube of claim 1, wherein opposing sidewalls that define the at least one groove are each convex along an axial span of the at least one groove.

10. The composite tube of claim 1, wherein opposing sidewalls that define the at least one groove are non-monotonic along an axial span of the at least one groove.

11. The composite tube of claim 1, wherein a radial depth of the at least one groove increases linearly along an axial span of the at least one groove.

12. The composite tube of claim 1, wherein a radial depth of the at least one groove is substantially uniform along an axial span of the at least one groove.

13. The composite tube of claim 1, wherein a bottom wall of the at least one groove is concave along an axial span of the at least one groove.

14. The composite tube of claim 1, wherein a bottom wall of the at least one groove is convex along an axial span of the at least one groove.

15. The composite tube of claim 1, wherein a bottom wall of the at least one groove is non-monotonic along an axial span of the at least one groove.

16. A joint assembly comprising:
   a composite tube comprising:
      a body having a longitudinal centerline axis; and
      an end portion comprising an end rim that is circumferentially continuous, wherein the end portion comprises a tapered section comprising at least one groove, wherein the at least one groove comprises a spiral shape that extends along and partially circumferentially around the tapered section; and
   a support wedge that at least partially engages at least one of a radially inward surface of the end portion and a radially outward surface of the end portion.

17. The joint assembly of claim 16, wherein the tapered section comprises a diverging section and a converging section, and wherein the at least one groove extends across both the diverging section and the converging section.

18. A method of forming a joint assembly, the method comprising:
   forming an end portion of a composite tube, wherein the end portion comprises a tapered section that comprises at least one of a diverging section, a converging section, and both of a diverging subsection followed by a converging subsection, wherein the tapered section comprises at least one groove formed thereon that comprises a spiral shape that extends partially circumferentially around the tapered section;
   engaging a support wedge to the end portion of the composite tube, wherein the support wedge comprises contours that complement the at least one groove of the tapered section; and
   curing or solidifying the composite tube.

* * * * *